(12) United States Patent
Li et al.

(10) Patent No.: US 11,316,584 B2
(45) Date of Patent: Apr. 26, 2022

(54) SATELLITE CONTROL METHOD AND APPARATUS

(71) Applicant: CHENGDU STAR ERA AEROSPACE TECHNOLOGY CO., LTD., Sichuan (CN)

(72) Inventors: Qiang Li, Sichuan (CN); Lei Wang, Sichuan (CN); Chuan Lu, Sichuan (CN)

(73) Assignee: CHENGDU STAR ERA AEROSPACE TECHNOLOGY CO., LTD.

( * ) Notice: Subject to any disclaimer, the term of this patent is extended or adjusted under 35 U.S.C. 154(b) by 0 days.

(21) Appl. No.: 17/419,701

(22) PCT Filed: Jun. 24, 2020

(86) PCT No.: PCT/CN2020/098109
§ 371 (c)(1),
(2) Date: Jun. 29, 2021

(87) PCT Pub. No.: WO2021/128775
PCT Pub. Date: Jul. 1, 2021

(65) Prior Publication Data
US 2021/0376918 A1    Dec. 2, 2021

(30) Foreign Application Priority Data
Dec. 24, 2019   (CN) .......................... 201911363616.4

(51) Int. Cl.
*H04B 7/15*   (2006.01)
*H04B 7/185*  (2006.01)

(52) U.S. Cl.
CPC ..... *H04B 7/18519* (2013.01); *H04B 7/18532* (2013.01)

(58) Field of Classification Search
CPC ...... H04B 7/15; H04B 7/185; H04B 7/18521; H04B 7/18519; H04B 7/18526; H04B 7/18532; H04B 7/14
See application file for complete search history.

(56) References Cited

U.S. PATENT DOCUMENTS

2008/0087769 A1   4/2008   Johnson
2011/0025554 A1*  2/2011   Bailey .................... G01C 11/00
                                                        342/355

(Continued)

FOREIGN PATENT DOCUMENTS

CN   101881969 A   11/2010
CN   105184038 A   12/2015

(Continued)

OTHER PUBLICATIONS

First Office Action corresponding CN201911363616.4 dated Jul. 30, 2020.

(Continued)

*Primary Examiner* — Blane J Jackson
(74) *Attorney, Agent, or Firm* — Barnes & Thornburg LLP

(57) ABSTRACT

The present disclosure provides a satellite control method and apparatus, comprising: receiving a to-be-photographed target site input by a user; calculating first moment information corresponding to each satellite entering the target site, according to location information of the target site and operation orbit information of the each satellite in a plurality of satellites; and determining, from the plurality of satellites, at least one to-execute satellite to photograph the target site according to the first moment information corresponding to the each satellite entering the target site.

18 Claims, 5 Drawing Sheets

(56) References Cited

U.S. PATENT DOCUMENTS

| | | | | |
|---|---|---|---|---|
| 2014/0313972 A1* | 10/2014 | Kim | ................. | G06F 16/51 |
| | | | | 370/316 |
| 2017/0293973 A1 | 10/2017 | Lustyk et al. | | |
| 2019/0337643 A1* | 11/2019 | Giraud | ............... | H04B 7/18521 |
| 2019/0354929 A1 | 11/2019 | Baldassari et al. | | |
| 2021/0036772 A1* | 2/2021 | Miranda | ............ | H04B 7/18513 |

FOREIGN PATENT DOCUMENTS

| | | | | | |
|---|---|---|---|---|---|
| CN | 105223595 A | | 1/2016 | | |
| CN | 108023636 A | | 5/2018 | | |
| CN | 109163704 A | | 1/2019 | | |
| CN | 109211245 A | | 1/2019 | | |
| CN | 109377075 A | | 2/2019 | | |
| CN | 109447394 A | | 3/2019 | | |
| CN | 109684055 A | | 4/2019 | | |
| CN | 110210453 A | | 9/2019 | | |
| CN | 111144742 A | | 5/2020 | | |
| CN | 112737660 A | * | 4/2021 | ............. | H04B 7/185 |

OTHER PUBLICATIONS

Second Office Action corresponding CN201911363616.4 dated Oct. 19, 2020.
Third Office Action corresponding CN201911363616.4 dated Jan. 18, 2021.
International Search Report and Written Opinion corresponding to PCT/EP2020/098109, dated Oct. 10, 2020.
First Search Report corresponding to CN201911363616.4.
Supplementary Search Report corresponding to CN201911363616.4.
Notification to Grant corresponding to CN201911363616.4 dated Apr. 27, 2021.
Chinese Notification to Grant Patent Right for Invention corresponding to application CN 20191136316.4 dated Apr. 27, 2021.
Second Supplementary Search of Priority Document corresponding to CN 201911363616.4 dated Jan. 18, 2021.

* cited by examiner

SATELLITE CONTROL METHOD AND APPARATUS

CROSS-REFERENCE TO RELATED APPLICATION

The present disclosure claims the benefit of priority to International Patent Application No. PCT/CN2020/098109, filed on Jun. 24, 2020, and to the Chinese patent application filed with the Chinese Patent Office on Dec. 24, 2019 with the filing No. 2019113636164, and entitled "Satellite Control Method and Apparatus", all the contents of each of which are incorporated herein by reference in their entirety, including but without limitation, those portions concerning satellite-related operations.

TECHNICAL FIELD

The present disclosure relates to the technical field of satellite communications, and in particular, provides a satellite control method and a satellite control apparatus.

BACKGROUND ART

The satellite is constructed by human beings, and launched into space by space flight vehicles such as rocket and space shuttle, so as to take a picture or video of the earth or a specific site on the earth.

In order to enable the satellite to take a picture or video of a specific site, an experienced skilled person is generally needed to make task plan for the satellite. When making the task plan for the satellite, the configuration staff generally need to know all knowledge about the satellite, for example, satellite energy and attitude, startup time of a camera, the number of ON and OFF of the camera, and other situations, and the configuration staff often need to send a control instruction to the satellite according to all of the above knowledge to acquire an image taken by the satellite satisfying the requirements.

However, operating and controlling the satellite for photographing by experienced configuration staff requires a high technical threshold, which is disadvantageous for popularization of the satellite photographing technology.

SUMMARY

Objectives of the present disclosure lie in providing a satellite control method and a satellite control apparatus, which can reduce the operation difficulty of the satellite control, so as to lower the technical threshold of the satellite control.

In order to achieve at least one of the above objectives, a technical solution adopted in the present disclosure is as follows.

An embodiment of the present disclosure provides a satellite control method, applicable to an operation control center communicated to the satellites, and the method includes: receiving a to-be-photographed target site (target location) input by a user; calculating first moment (time point) information corresponding to each of satellites entering the target site respectively, according to location information (position information) of the target site, operation orbit information of each satellite in the plurality of satellites, and location information of the each satellite at a current moment; and determining, from a plurality of satellites, at least one to-execute satellite to photograph the target site, according to the first moment information corresponding to each of the satellites entering the target site respectively.

In the above embodiment, the user can acquire an image of the target site just by inputting the to-be-photographed target site. Through the above method, the operation difficulty of satellite control can be reduced, thereby lowering the technical threshold of the satellite control.

Optionally, as a possible implementation, the step of determining from a plurality of satellites at least one to-execute satellite to photograph the target site according to the first moment information corresponding to each of the satellites entering the target site respectively includes: determining a satellite entering the target site in the first place as the to-execute satellite according to the first moment information corresponding to each of the satellites entering the target site respectively, wherein the first moment information includes a first moment; and arranging the to-execute satellite to photograph the target site.

In the above embodiment, the satellite that reaches the target site in the first place may be used as the to-execute satellite to photograph the target site, so that the time of photographed image data of the target site is the earliest.

Optionally, as a possible implementation, the step of determining from a plurality of satellites at least one to-execute satellite to photograph the target site according to the first moment information corresponding to each of the satellites entering the target site respectively includes: calculating available storage resource of each satellite at a first moment corresponding to each satellite in the plurality of satellites entering the target site respectively, wherein the first moment information includes the first moment; and determining, from the plurality of satellites, at least one to-execute satellite to photograph the target site, according to the available storage resource of each satellite in the plurality of satellites, wherein the available storage resource of each of the to-execute satellites is capable of satisfying the storage resource requirement for photographing the target site.

In the above embodiment, the available storage resource of each satellite in the plurality of satellites may be calculated when the satellite enters the target site, and the to-execute satellite capable of photographing the target site can be determined according to the amount of the available storage resource, so as to ensure that the photographing task can be executed normally.

Optionally, as a possible implementation, the step of determining from a plurality of satellites at least one to-execute satellite to photograph the target site according to the first moment information corresponding to each of the satellites entering the target site respectively includes: calculating available storage resource of each satellite at the first moment corresponding to each satellite in the plurality of satellites entering the target site respectively, wherein the first moment information includes the first moment; selecting, from the plurality of satellites, all candidate satellites according to the available storage resource of each satellite in the plurality of satellites, wherein each of the candidate satellites has the storage resource required for photographing the target site; determining, from the selected candidate satellites, a satellite entering the target site in the first place as the to-execute satellite according to the selected candidate satellites and the first moment information corresponding to the selected candidate satellites entering the target site respectively; and arranging the to-execute satellite to photograph the target site.

In the above embodiments, the available storage resource of each satellite in the plurality of satellites may be calculated when the satellite enters the target site, and the to-execute satellite for photographing the target site may be determined according to the amount of available storage resource and the first moment information entering the target site, which not only can ensure that the photographing task can be executed normally, but also can ensure that the time of photographed image data of the target site is the earliest.

Optionally, as a possible implementation, the step of calculating available storage resource of each satellite at the first moment corresponding to each satellite in the plurality of satellites entering the target site respectively includes: calculating second moment information corresponding to each satellite in the plurality of satellites entering a corresponding ground station respectively, wherein the ground station is configured to receive information returned by a corresponding satellite, and the second moment information includes the second moment; and determining the available storage resource of each satellite at the first moment corresponding to each of the satellites entering the target site respectively, according to the second moment information and the first moment information of each of the satellites.

In the above embodiment, to calculate the available storage resource of each satellite at the first moment, the second moment information corresponding to each satellite entering corresponding ground station may be calculated first, then it is judged whether the second moment corresponding to the second moment information is before or after the first moment, wherein if the second moment is before the first moment, it means that the space of the available storage resource of the corresponding satellite when entering the target site is increased, so that it indicates that the number of to-execute satellites that can be selected in this case is increased compared to that when the second moment is after the first moment.

Optionally, as a possible implementation, the step of determining the available storage resource of each satellite at the first moment corresponding to each of the satellites entering the target site respectively according to the second moment information and the first moment information of each of the satellites includes: calculating the available storage resource of each of the satellites at the current moment; and comparing the second moment with the first moment, wherein if the second moment is before the first moment, the available storage resource of each satellites freed up after the satellite passes the corresponding ground station is calculated, the available storage resource of each satellite at the current moment plus the available storage resource of the each satellites freed up after the satellite passes the corresponding ground station is taken as the available storage resource of each satellite at the first moment corresponding to each of the satellites entering the target site respectively; and if the second moment is after the first moment, the available storage resource of each of the satellites at the current moment is taken as the available storage resource of each satellite at the first moment corresponding to each of the satellites entering the target site respectively.

Optionally, as a possible implementation, the step of calculating second moment information corresponding to each satellite in the plurality of satellites entering a corresponding ground station respectively includes: calculating angle information of each satellite in the plurality of satellites relative to the corresponding ground station at the current moment according to location information of each satellite in the plurality of satellites at the current moment and location information of the ground station corresponding to the each satellite in the plurality of satellites; and calculating second moment information of each satellite in the plurality of satellites when entering the corresponding ground station according to the angle information of each satellite in the plurality of satellites relative to the corresponding ground station at the current moment, antenna constraint condition, and operation orbit information of each satellite in the plurality of satellites.

In the above embodiment, angle information of each satellite relative to the ground station may be calculated first, and then the second moment information of each satellite entering the ground station is calculated according to the angle information, antenna constraint condition, and satellite orbit of each satellite.

Optionally, as a possible implementation, the step of calculating angle information of each satellite in the plurality of satellites relative to the corresponding ground station at the current moment according to location information of each satellite in the plurality of satellites at the current moment and location information of the ground station corresponding to the each satellite in the plurality of satellites includes: converting coordinates related to location information of each of the satellites at the current moment from a J2000 coordinate system to an earth-fixed coordinate system; calculating location coordinates of each of the satellites in a station coordinate system according to the coordinates of each of the satellites in the earth-fixed coordinate system; and calculating angle information of each of the satellites relative to the ground station at the current moment, according to location coordinates of each of the satellites in the station coordinate system.

Optionally, as a possible implementation, the step of calculating available storage resource of each satellite at a first moment corresponding to each satellite in the plurality of satellites entering the target site respectively includes:

calculating the available storage resource of each satellite in the plurality of satellites at the current moment; calculating storage resource that has been deducted from each of the satellites, with the storage resource occupied by a to-be-executed photographing task; and calculating a difference between the available storage resource of each satellite in the plurality of satellites at the current moment and the storage resource that has been deducted from the corresponding satellite, wherein the difference is the available storage resource of the corresponding satellite at the first moment.

Optionally, as a possible implementation, after determining, from the plurality of satellites, at least one to-execute satellite to photograph the target site according to the available storage resource of each satellite in the plurality of satellites, the method further includes: feeding back satellite information of the at least one to-execute satellite to a user terminal, and outputting prompt information, wherein the prompt information is used to prompt the user to select one target satellite from the at least one to-execute satellite to photograph the target site; and putting the photographing task of photographing the target site into a task list of the target satellite, and deducting from the target satellite the storage resource required to be occupied for photographing the target site.

In the above embodiment, the at least one to-execute satellite capable of photographing the target site may be fed back to a user terminal held by the user, and then the user is reminder to select one target satellite therefrom, and this target satellite is determined to execute the photographing task of photographing the target site, and subsequently, the storage resource required to be occupied for photographing the target site is deducted from the target satellite, which can avoid screening result from being affected by repeated selection of the storage resource, thus bringing more accurate constraint condition to the next satellite screening.

Optionally, as a possible implementation, the step of calculating first moment information corresponding to each satellite entering the target site according to location information of the target site, operation orbit information of each satellite in the plurality of satellites, and location information of the each satellite at a current moment includes: calculating angle information of each of the satellites relative to the target site at the current moment according to location information of each satellite in the plurality of satellites and the location information of the target site; and calculating the first moment information of each of the satellites entering the target site according to the angle information of each of the satellites relative to the target site at the current moment, and operation orbit information of each of the satellites.

Optionally, as a possible implementation, the step of calculating angle information of each of the satellites relative to the target site at the current moment according to location information of each satellite in the plurality of satellites and the location information of the target site includes: converting the coordinates of the target site from a spherical coordinate system to an earth-fixed coordinate system; converting the coordinates of the target site from the earth-fixed coordinate system to the J2000 coordinate system; converting the coordinates of the target site from the J2000 coordinate system to an orbital coordinate system; and calculating angle information of each of the satellites relative to the target site at the current moment using the coordinates of the target site in the orbital coordinate system, and coordinates related to the location information of each of the satellites at the current moment.

An embodiment of the present disclosure further provides a satellite control method, wherein the method includes: displaying, in response to a user's operation request of a button of "Target Selection", second prompt information on a display interface of a terminal device, wherein the second prompt information is used to guide the user to input a to-be-photographed target site, and/or the second prompt information is used to guide the user to select one to-be-photographed target site from a plurality of to-be-selected sites displayed on the display interface of the terminal device; responding to a target site operation request of the user, wherein the target site is the to-be-photographed target site input by the user and/or the to-be-photographed target site selected from a plurality of to-be-selected sites by the user; and executing, in response to a task planning request of the user, a step of calculating the first moment information corresponding to each of the satellites entering the target site respectively, according to location information of the target site, operation orbit information of each satellite in a plurality of satellites, and location information of each of the satellites at a current moment.

Optionally, as a possible implementation, before displaying, in response to a user's operation request of a button of "Target Selection", second prompt information on a display interface of a terminal device, the method further includes: displaying satellite information of the plurality of satellites on the display interface of the terminal device, in response to a satellite selection request of the user; and selecting a target satellite in response to a satellite pick-up request of the user, wherein the target satellite is a satellite corresponding to the satellite pick-up request of the user in the plurality of satellites.

An embodiment of the present disclosure further provides a satellite control apparatus, wherein the apparatus includes: a coordinate receiving module, configured to receive a to-be-photographed target site input by a user; a moment calculating module, configured to calculate first moment information corresponding to each of the satellites entering the target site respectively, according to location information of the target site, operation orbit information of each satellite in the plurality of satellites, and location information of each satellite at a current moment; and a task determining module, configured to determine, from the plurality of satellites, at least one to-execute satellite to photograph the target site according to the first moment information corresponding to each of the satellites entering the target site respectively.

An embodiment of the present disclosure further provides a satellite control apparatus, wherein the apparatus includes: a site operating module, configured to display, in response to a user's operation request of a button of "Target Selection", second prompt information on a display interface of a terminal device, wherein the second prompt information is used to guide the user to input the to-be-photographed target site, and/or the second prompt information is used to guide the user to select one to-be-photographed target site from a plurality of to-be-selected sites displayed on the display interface of the terminal device; and further configured to respond to a target site operation request of the user, wherein the target site is the to-be-photographed target site input by the user and/or the to-be-photographed target site selected from the plurality of to-be-selected sites by the user; and a task planning module, configured to execute in response to a task planning request of the user, a step of calculating the first moment information corresponding to each of the satellites entering the target site respectively, according to location information of the target site, operation orbit information of each satellite in the plurality of satellites, and location information of each of the satellites at a current moment.

An embodiment of the present disclosure further provides an electronic device, including: a processor, a memory, and a bus, wherein the memory is stored with a machine readable instruction executable by the processor; and when the electronic device runs, the processor communicates with the memory through the bus, and the machine readable instruction enables, when executed by the processor, execution of the above satellite control method.

An embodiment of the present disclosure further provides a readable storage medium, wherein the readable storage medium is stored thereon with a computer program, and the computer program enables, when run by a processor, execution of the above satellite control method.

An embodiment of the present disclosure further provides a computer program product, wherein the computer program product enables, when running on a computer, the computer to execute the above satellite control method.

DETAILED DESCRIPTION OF EMBODIMENTS

Some embodiments of the present disclosure are described below in combination with the accompanying drawings, and it should be understood that some embodiments described herein are merely used to explain and illustrate the present disclosure, and are not intended to limit the present disclosure.

Figure 1:
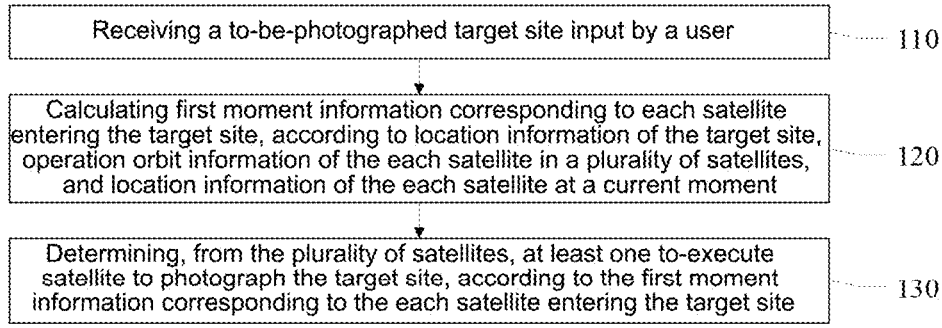
FIG. 1 is a schematic flowchart of a satellite control method provided in an embodiment of the present disclosure.

FIG. 1 is a satellite control method provided in an embodiment of the present disclosure, wherein the satellite control method may be applied to an electronic device, and the electronic device may be a device capable of performing large data calculation and mass data storage, for example, the electronic device may be a server, or a computer with strong computing capacity. In the above, the electronic device may serve as an operation control center communicated to the satellites, and the satellite control method provided in an embodiment of the present disclosure may include following Step 110 to Step 130:

Step 110, receiving a to-be-photographed target site input by a user.

In some possible embodiments, the target site may be a site that the user intends to perform photographing. Optionally, the user may input the target site in a plurality of manners, for example, the user may input a longitude value and a latitude value of the target site, the user may also input a city name, and the user may also click a point corresponding to the target site on a two-dimensional map or a three-dimensional map displayed on a display interface.

It should be noted that, in some possible embodiments, when inputting the target site, the user may input by text or by voice; certainly, it may be understood that the manner in which the user inputs the target site in the foregoing examples should not be construed as limitation to the present disclosure, for example, in some other possible implementations of the embodiments of the present disclosure, the user may also use other terminal devices to send the target site to the electronic device.

Step 120, calculating first moment information corresponding to each satellite entering the target site, according to location information of the target site, operation orbit information of each satellite in the plurality of satellites, and location information of each satellite at a current moment.

In some possible application scenarios, each satellite in the plurality of satellites may operate in a respective satellite orbit. A first moment when each satellite in the plurality of satellites enters the target site may be the moment when the corresponding satellite can photograph the target site.

For convenience of description, a first satellite being any one of the plurality of satellites is taken as an example for illustration below.

In some possible implementations, the electronic device may obtain a satellite orbit of each satellite, for example, the electronic device may perform numerical integration calculation according to the epoch moment and the initial number of orbits in J2000 in combination with earth aspherical gravitational perturbation, third body perturbation, tidal perturbation, light pressure perturbation and atmospheric perturbation, to obtain information such as orbit, location coordinates, and speed of the satellite at any time, so as to obtain the satellite orbit of each satellite.

Figure 5:
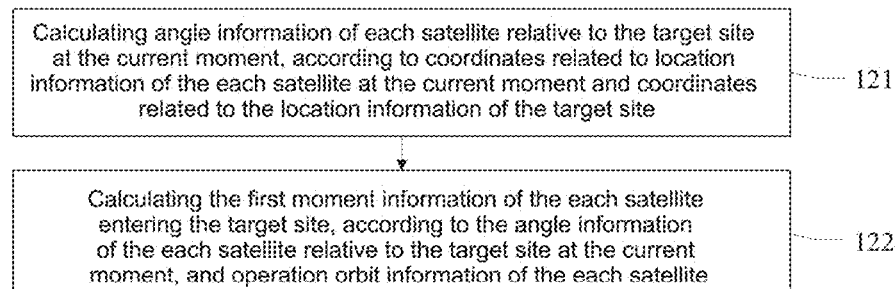
FIG. 5 is a schematic flowchart of sub-steps of Step 120 in FIG. 1.

Optionally, as a possible embodiment, referring to FIG. 5, when the electronic device calculates the first moment information corresponding to each satellite entering the target site, the embodiment adopted may include following Step 121 to Step 122:

Step 121, calculating angle information of each satellite relative to the target site at the current moment according to coordinates related to location information of each satellite at the current moment and coordinates related to the location information of the target site.

Optionally, as a possible embodiment, the embodiment adopted in Step 121 may include the following Step 1211 to Step 1214:

Step 1211, converting the coordinates of the target site from a spherical coordinate system to an earth-fixed coordinate system.

In some possible implementations, a coordinate system established with the earth center as an origin may be used as a spherical coordinate system (h, λ, φ), where h may represent height of the earth, λ may represent longitude of the earth, φ may represent latitude of the earth, the longitude φ of the earth may be an included angle between a normal line of a reference ellipsoid of the target site and an equatorial plane, wherein it is positive when measured from an equatorial plane to the north, and negative when measured from the equatorial plane to the south.

In the above, the electronic device may convert the coordinates of the target site into the earth-fixed coordinate system according to the following formula:

$$\begin{cases} X_e = (N+h)\cos\varphi\cos\lambda \\ Y_e = (N+h)\cos\varphi\sin\lambda \\ Z_e = [N(1-f)^2 + h]\sin\varphi \end{cases}$$

In the formula, $(X_e, Y_e, Z_e)$ may represent coordinates of the target site in the earth-fixed coordinate system, $N=a_e$ $[\cos^2\varphi + (1-f)^2 \sin^2\varphi]^{-1/2} = a_e[1-2f(1-f/2)\sin^2\varphi]^{-1/2}$, $a_e$ may represent equatorial radius of the reference ellipsoid, and f may represent geometric flatness of the reference ellipsoid.

Optionally, in a possible embodiment, h and φ in the above formula may be replaced with a geocentric distance ρ and a geocentric latitude φ' of the target site respectively, therefore, the calculation formula by which the electronic device converts the coordinates of the target site into the earth-fixed coordinate system may be updated as follows:

$$\begin{cases} X_e = \rho\cos\varphi'\cos\lambda \\ Y_e = \rho\cos\varphi'\sin\lambda \\ Z_e = \rho\sin\varphi' \end{cases}$$

Step 1212, converting the coordinates of the target site from the earth-fixed coordinate system to the J2000 coordinate system.

In some possible embodiments, the electronic device may calculate a vector $r_{station}$ of the target site in the J2000 coordinate system according to the following formula $$r_{station} = (HG)^{-1} R_{station}$$

In the above, $R_{station}$ may represent a vector of the coordinates of the target site in the earth-fixed coordinate system; HG may represent a conversion matrix from the J2000 coordinate system to the earth-fixed coordinate system, HG may be obtained through calculation according to a formula (HG)=(EP)(ER)(NR)(PR), EP may represent a preset earth pole movement matrix, ER may represent a sidereal time conversion matrix, NR may represent a nutation matrix, and PR may represent be a procession matrix, where all of ER, NR, and PR are time functions, and may be obtained according to corresponding moments of the satellite, for example, the moments corresponding to the satellite are brought into a preset calculation function according to a preset calculation function, so as to obtain the preceding ER, NR, and PR.

Step 1213, converting the coordinates of the target site from the J2000 coordinate system to an orbital coordinate system.

In some possible embodiments, the origin of the orbital coordinate system may coincide with centroid of each satellite, axis $z_0$ of the orbital coordinate system may point to the earth's core, axis $x_0$ may be perpendicular to the axis $z_0$, and point to a flight direction of the satellite, axis $y_0$ may be perpendicular to a plane $x_0 z_0$, and the axes $x_0$, $y_0$ and $z_0$ constitute a right-handed coordinate system.

In this way, the electronic device may calculate the vector $r_{orbit}$ of the coordinates of the target site in the orbital coordinate system according to the following formula:

$$r_{orbit} = T \cdot (r_{station} - r_{sat})$$

In the above, $r_{sat}$ may represent the vector of the satellite in the J2000 coordinate system, $T = R_x(-\pi/2) \cdot R_z(\omega + f' + \pi/2) \cdot R_x(i) \cdot R_z(\Omega)$, ω may represent orbital perigee depression angle, f' may represent orbital true anomaly, i may represent orbital inclination, Ω may represent right ascension of ascending node, $$R_z(\theta) = \begin{pmatrix} \cos\theta & \sin\theta & 0 \\ -\sin\theta & \cos\theta & 0 \\ 0 & 0 & 1 \end{pmatrix}, R_x(\theta) = \begin{pmatrix} 1 & 0 & 0 \\ 0 & \cos\theta & \sin\theta \\ 0 & -\sin\theta & \cos\theta \end{pmatrix},$$

and θ represents corresponding angle parameter.

Step 1214, calculating angle information of each satellite relative to the target site at the current moment using the coordinates of the target site in the orbital coordinate system and coordinates related to the location information of each satellite at the current moment.

In some possible implementations, the angle information of the satellite may include an azimuth angle and an altitude angle, and when calculating the angle information of the satellite, the electronic device may calculate the azimuth angle Az' according to the following formula:

$$Az' = a\tan((r_{orbit} \cdot y)/(r_{orbit} \cdot x))$$

Besides, the electronic device may calculate the altitude angle El' according to the following formula:

$$El' = a\tan\left[(r_{orbit} \cdot z) / \sqrt{(r_{orbit} \cdot x)^2 + (r_{orbit} \cdot Y)^2}\right]$$

In the above, $r_{orbit} \cdot z$ may represent a component of the target site in a direction $z_0$ in the orbital coordinate system, $r_{orbit} \cdot y$ may represent a component of a valid target site in a direction $y_0$ in the orbital coordinate system, $r_{orbit} \cdot x$ may represent a component of the valid target site in a direction $x_0$ in the orbital coordinate system, and a tan represents an arctangent function.

Moreover, the electronic device may also calculate a distance $\rho_{sat}$ from coordinates of the satellite at the current moment to the target site according to the following formula:

$$\rho_{sat} = |r_{orbit}|$$

Step 122, calculating the first moment information of each satellite entering the target site according to the angle information of each satellite relative to the target site at the current moment, and operation orbit information of each satellite.

In some possible embodiments, the angle information on the satellite orbit and the moment information generally have a one-to-one correspondence, therefore, the electronic device may calculate the first moment information of each satellite entering the target site according to the angle information of each satellite relative to the target site at the current moment, and the satellite orbit of each satellite.

Step 130, determining, from a plurality of satellites, at least one to-execute satellite to photograph the target site, according to the first moment information corresponding to each satellite entering the target site.

In some possible embodiments, the to-execute satellite may refer to a satellite capable of executing a photographing task of photographing the target site; and after determining the at least one to-execute satellite, the electronic device may send the at least one to-execute satellite to the user, and the user selects a satellite to photograph the target site.

Optionally, in some possible implementations, the step of determining from a plurality of satellites at least one to-execute satellite to photograph the target site according to the first moment information corresponding to each satellite entering the target site, respectively includes:

determining a satellite entering the target site in the first place as the to-execute satellite, according to the first moment information corresponding to each satellite entering the target site, wherein the first moment information includes a first moment; and arranging the to-execute satellite to photograph the target site.

In the above implementation, the satellite that reach the target site in the first place may be used as the to-execute satellite to photograph the target site, so that the time of photographed image data of the target site is the earliest.

Figure 2:
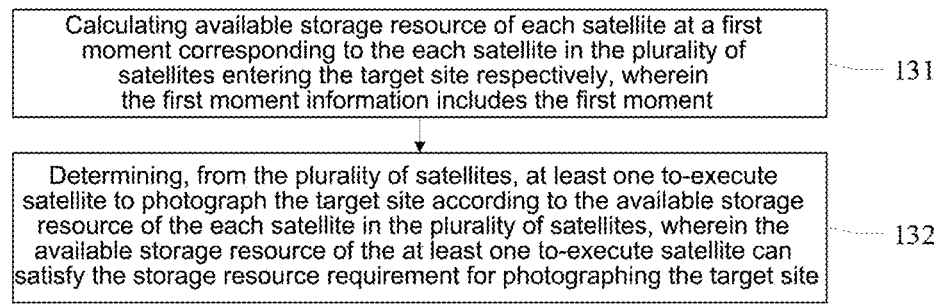
FIG. 2 shows a schematic flowchart of an embodiment of Step 130.

Optionally, as a possible implementation, referring to FIG. 2, FIG. 2 shows a schematic flowchart of an embodiment of Step 130, and in some possible embodiments, the embodiment when the electronic device executes Step 130 may include the following Step 131 to Step 132:

Step 131, calculating available storage resource of each satellite at the first moment corresponding to each satellite in the plurality of satellites entering the target site respectively, wherein the first moment information includes the first moment.

In some possible embodiments, the available storage resource may refer to a storage space of the satellite capable of storing the photographed videos or images, and in the embodiment of the present disclosure, the storage resource may be used as one of the conditions for determining whether a certain satellite in the plurality of satellites is capable of performing the photographing task.

Step 132, determining, from the plurality of satellites, at least one to-execute satellite to photograph the target site according to the available storage resource of each satellite in the plurality of satellites, wherein the available storage resource of each to-execute satellite can satisfy the storage resource requirement for photographing the target site.

Optionally, the electronic device may determine at least one to-execute satellite according to the first moment information corresponding to each satellite in the plurality of satellites entering the target site, available storage resource of each satellite at the first moment, and performance parameters of each satellite.

It should be noted that, in some possible embodiments, the satellite determined as the to-execute satellite may satisfy the following conditions: the available storage resource of the satellite at the first moment can satisfy the storage resource requirement for photographing the target site.

Exemplarily, the electronic device may calculate the available storage resource of each satellite at the first moment, and calculate the storage resource required for photographing the target site, and then judge, upon comparison between the available storage resource of each satellite at the first moment and the storage resource required for photographing the target site, whether the difference between the two is greater than zero or a preset threshold, wherein if the difference between the available storage resource of the satellite at the first moment and the storage resource required for photographing the target site is greater than zero or the preset threshold, the electronic device may determine the satellite as the to-execute satellite, otherwise, determine the satellite as a non-executable satellite.

In the above, it should be noted that when the electronic device compares the available storage resource of the satellite at the first moment with the storage resource required for photographing the target site, the available storage resource of the satellite at the first moment may be greater than the storage resource required for photographing the target site; it is also feasible that the difference between the available storage resource and the storage resource required by the target site may be greater than a preset threshold, for example, the available storage resource is a, and the storage resource required for photographing the target site is b, then (a-b) is greater than the preset threshold c.

In addition, in some possible embodiments, the performance parameters of the satellite may be preset constraint conditions, and the preset constraint conditions may be constraint conditions which are preset and do not change; certainly, in some other possible implementations of the embodiments of the present disclosure, the above constraint conditions may also be adjusted, for example, when the constraint conditions need to be changed, a modification instruction may be sent by the configuration staff to the electronic device, so as to modify the constraint conditions, so that the electronic device executes Step 132 in combination with the modified constraint conditions.

Moreover, in some possible embodiments, the preset constraint conditions include satellite resource conditions, satellite constraint conditions, load (payload) constraint conditions, and ground constraint conditions. In the above, the satellite resource conditions may be spatial storage, electric quantity, data transmission rate, etc. of the satellite, and the satellite constraint conditions may be attitude control constraint of the satellite; the load constraint conditions may be a load field angle or resolution; the ground constraint conditions may be a receiving angle of a ground station on the ground, data transmission rate of antenna, etc.; in addition, some other comprehensive constraint conditions may also be taken into consideration, such as the amount of data that can be transmitted during the time period in which the satellite passes the ground station.

In this way, the electronic device may judge whether there is a target satellite capable of executing the photographing task corresponding to the target site in the plurality of satellites, in combination with the preset constraint conditions and the first moment information calculated through the above steps. For example, the electronic device may judge whether the remaining electric quantity when each satellite flies to the target site can support the satellite to complete the photographing task, or judge whether the attitude angle when each satellite flies to the target site can be motivated to the angle for photographing the target site, or judge whether the remaining storage space when each satellite flies to the target site is sufficient to complete the photographing task of the target site, etc., wherein if any satellite in the plurality of satellites does not satisfy any one of the above judgment conditions, the electronic device may determine that the photographing task corresponding to the target site cannot be arranged to the corresponding satellite to execute; and if there is a target satellite in the plurality of satellites satisfies any one of the above judgment conditions, the electronic device may determine that the photographing task corresponding to the target site may be executed by the target satellite.

Optionally, in some possible implementations, the step of determining, from a plurality of satellites, at least one to-execute satellite to photograph the target site according to the first moment information corresponding to each satellite entering the target site respectively includes:

calculating available storage resource of each satellite in the plurality of satellites at a first moment when the satellite enters the target site, wherein the first moment information includes the first moment;

selecting, from the plurality of satellites, all candidate satellites according to the available storage resource of each satellite in the plurality of satellites, wherein each of the candidate satellites has the storage resource satisfying the requirement for photographing the target site;

determining, from the selected candidate satellites, a satellite entering the target site in the first place as the to-execute satellite, according to the selected candidate satellites and the first moment information corresponding to the selected candidate satellites entering the target site respectively; and arranging the to-execute satellite to photograph the target site.

In the above embodiment, the available storage resource of each satellite in the plurality of satellites may be calculated when the satellite enters the target site, and the to-execute satellite for photographing the target site may be determined according to the amount of available storage resource and the first moment information the satellite entering the target site, which not only can ensure that the photographing task can be executed normally, but also can ensure that the time of photographed image data of the target site is the earliest.

Optionally, in some possible embodiments, after the electronic device executes Step 132, the satellite control method may further include: feeding back satellite information of at least one to-execute satellite to a user terminal, and outputting prompt information, wherein the prompt information may be used to prompt the user to select one target satellite from the at least one to-execute satellite to photograph the target site; and putting the photographing task of photographing the target site into a task list of the target satellite, and deducting from the target satellite the storage resource required to be occupied for photographing the target site.

After allocating the photographing task corresponding to the target site to the target satellite that can execute the photographing task, the electronic device may return relevant parameters of the photographing task to the user, for example, the relevant parameters in the preceding may include imaging time, imaging angle, resolution, data receiving time, etc. of the above target satellite.

In some possible embodiments, the execution of the photographing task generally needs to occupy the storage resource, for example, for a photographing task configured in advance, the corresponding photographing moment has occupied the storage resource, and a picture photographed when executing the photographing task needs to occupy the storage space of the satellite; in addition, the satellite may need to transmit the picture to the ground station when passing the ground station on the ground, at which time, the storage space of the ground station also may need to be occupied.

Therefore, in the embodiment of the present disclosure, by deducting the storage resource occupied by the photographing task from the corresponding remaining resource, whether each satellite can receive a next photographing task can be better evaluated.

Optionally, in some possible implementations of the embodiments of the present disclosure, the electronic device may perform judgment, according to the above embodiments, for a plurality of photographing tasks including the photographing task corresponding to the target site, that is, recording a plurality of photographing tasks in a task list, and judging whether there is a certain satellite in the plurality of satellite that can execute the photographing task in the task list.

For example, the electronic device may rank the photographing tasks in the task list according to task priorities from high to low, then according to the ranked order, successively judge, when corresponding to each satellite, whether each photographing task can be put into the task list of a certain satellite in the plurality of satellites according to the first moment information corresponding to each satellite entering the target site, the available storage resource of each satellite at the first moment, and the performance parameters of each satellite.

Optionally, as a possible embodiment, the priorities of photographing tasks in the task list may be divided according to parameters of the target sites, for example, the priority of the target site corresponding to a large number of people is high, and the priority of the target site corresponding to a small number of people is low. Certainly, it may be understood that, in some other possible implementations of the embodiments of the present disclosure, the priorities of the photographing tasks may also be divided according to some other dimensions, for example, the priorities of the photographing tasks may also be divided according to user levels of initiators of the photographing tasks. The higher the user level of the initiator is, the higher the corresponding photographing task priority is, and the lower the user level of the initiator is, the lower the corresponding photographing task priority is.

Optionally, the electronic device may adopt the following two possible implementations when executing Step 131 to calculate available storage resource of each satellite at the first moment corresponding to each satellite in the plurality of satellites entering the target site respectively, wherein the first possible implementation includes:

calculating available storage resource of each satellite in the plurality of satellites at a current moment;

calculating storage resource that has been deducted from each satellite, with the storage resource occupied by a to-be-executed photographing task; and calculating a difference between the available storage resource of each satellite in the plurality of satellites at the current moment and the storage resource that has been deducted from the corresponding satellite, wherein the difference is the available storage resource of the corresponding satellite at the first moment.

In the above embodiments, for example, the storage resource which is occupied by the to-be-executed photographing task and has been deducted from each satellite may refer to that each satellite has been arranged with other photographing tasks that have not been executed before being arranged to photograph the target site input by the user; it may be understood that although the foregoing photographing task that has not been executed is not executed, as a part of the storage resource will be occupied in the subsequent execution process, when planning a photographing task for each satellite, the storage resource occupied by the photographing task may be deducted from the corresponding satellites, thus, the calculated available storage resource at the first moment corresponding to each satellite entering the target site is more accurate, by calculating the storage resource which is occupied by the to-be-executed photographing task and has been deducted from each satellite, so that a more accurate constraint condition is brought to the screening of satellite this time.

Figure 3:
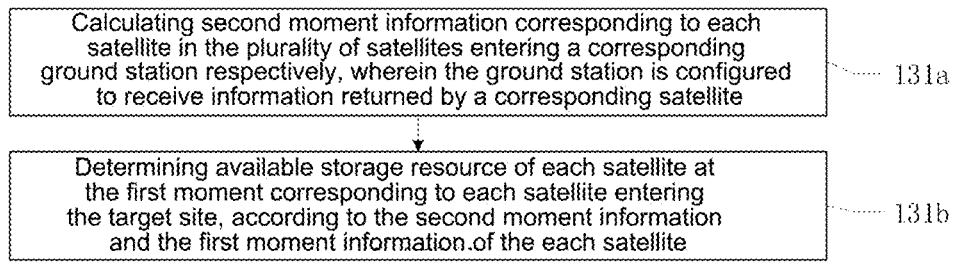
FIG. 3 shows a schematic flowchart of sub-steps of Step 131 in FIG. 2.

For a second possible implementation, referring to FIG. 3, FIG. 3 shows a schematic flowchart of sub-steps of Step 131 in FIG. 2, and in some possible implementations of the embodiments of the present disclosure, Step 131 may include the following steps 131a to 131b:

Step 131a, calculating second moment information corresponding to each satellite in the plurality of satellites entering a corresponding ground station respectively, wherein the ground station may be configured to receive information returned by a corresponding satellite, and the second moment information includes a second moment.

In some possible embodiments, the ground station may be configured to receive information returned by each corresponding satellite when the each satellite enters the ground station, wherein the returned information may include a task result of the photographing task, and the second moment when each satellite entering the ground station may be an earliest moment when the each satellite can perform data interaction with the ground station.

In the above, as each satellite generally operates along respective satellite orbit thereof, the each satellite may transmit the photographed information to the ground station when entering a signal radiation range of the ground station along the orbit.

Figure 4:
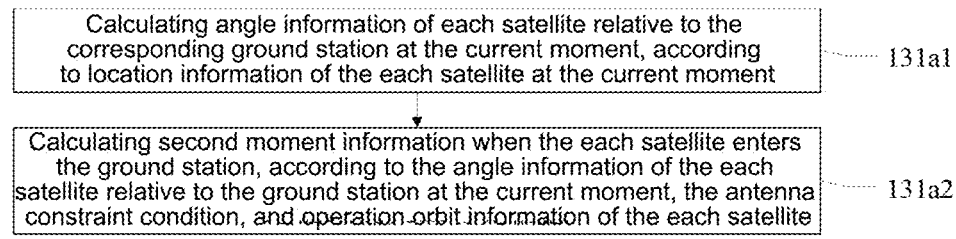
FIG. 4 shows a schematic flowchart of sub-steps of Step 131a in FIG. 3.

Optionally, as a possible embodiment, referring to FIG. 4, FIG. 4 shows a schematic flowchart of sub-steps of Step 131*a* in FIG. 3, and as a possible embodiment, Step 131*a* may include the following Steps 131*a*1 to step 131*a*2:

Step 131*a*1, calculating angle information of each satellite relative to the corresponding ground station at the current moment, according to location information of each satellite at the current moment.

Optionally, as a possible embodiment, Step 131*a*1 may include the following Step 131*a*-1 to step 131*a*1-3:

Step 131*a*1-1, converting coordinates related to location information of each satellite at the current moment from the J2000 coordinate system to the earth-fixed coordinate system.

In some possible embodiments, the origin of the J2000 coordinate system may be the earth's core, an xy coordinate plane may be a flat equatorial plane at an epoch J2000.0 moment, and an x-axis direction may be an equinox of the epoch.

The origin of the earth-fixed coordinate system may be the earth's core, a z-axis direction may be an average polar direction of the earth, the xy coordinate plane may be an equatorial plane of the earth that crosses the earth's core and is perpendicular to the average polar direction, and the x-axis may point to the Greenwich meridian direction.

Optionally, in some possible embodiments, the electronic device may calculate a vector $R_{sat}$ of each satellite in the earth-fixed coordinate system according to the following formula:

$R_{sat}=(HG)r_{sat}$, where $r_{sat}$ may represent a vector of each satellite in the J2000 coordinate system.

Step 131*a*1-2, calculating location coordinates of each satellite in a station coordinate system according to the coordinates of each satellite in the earth-fixed coordinate system.

In some possible embodiments, a coordinate origin of the station coordinate system may be provided at a center of the ground station, an axis x may point to an east direction on a horizontal plane passing the coordinate origin of the station coordinate system, an axis y may point to a north direction passing the coordinate origin of the station coordinate system, and an axis z may be perpendicular to an xy plane, and constitutes a right-handed coordinate system with the axis x and the axis y.

The electronic device may calculate a location vector R' of each satellite in the station coordinate system according to the following formula:

$$R' = R_y\left(\varphi_0 - \frac{\pi}{2}\right)R_z(\lambda_0 - \pi)(R_{sat} - R_{station})$$

In the above, $R_{sat}$ is vector of location of the satellite in the earth-fixed coordinate system, geodetic coordinates of the ground station are expressed as $$(\lambda_f, \varphi_0, h_0), R_y(\theta) = \begin{pmatrix} \cos\theta & 0 & -\sin\theta \\ 0 & 1 & 0 \\ \sin\theta & 0 & \cos\theta \end{pmatrix}, R_z(\theta) = \begin{pmatrix} \cos\theta & \sin\theta & 0 \\ -\sin\theta & \cos\theta & 0 \\ 0 & 0 & 1 \end{pmatrix},$$

θ is a corresponding angle parameter, and $R_{station}$ is an earth-fixed vector of the ground station.

Step 131*a*1-3, calculating angle information of each satellite relative to the ground station at the current moment, according to location coordinates of each satellite in the station coordinate system.

In some possible embodiments, the angle information may include an azimuth angle and an altitude angle, and it is assumed that the location vector of each satellite in the station coordinate system calculated by the electronic device through Step 1212 is expressed as R' (X,Y,Z), then the electronic device may calculate an azimuth angle Az and an altitude angle El according to the following formula:

$$Az = a\sin\left(Y/\sqrt{X^2 + Y^2}\right)$$
$$El = a\tan\left(Z/\sqrt{X^2 + Y^2}\right)$$

In the above, a tan is an arctangent function, and a sin is an arcsin function.

Step 131*a*1-2, calculating second moment information when each satellite enters the ground station, according to the angle information of each satellite relative to the ground station at the current moment, the antenna constraint condition, and operation orbit information of each satellite.

In some possible implementations, the above antenna constraint conditions are preset, for example, it may be a preset angle radiated by the ground station, and in some possible scenarios, the angle radiated by the ground station may be fixed.

As the angle information and the moment information on the satellite orbit are corresponding to each other one by one, the second moment information when each satellite enters the ground station may be calculated, according to the angle information of each satellite relative to the ground station at the current moment, in combination with the antenna constraint conditions, and a satellite orbit of each satellite.

Step 131*b*, determining available storage resource of each satellite at the first moment corresponding to each satellite entering the target site, according to the second moment information and the first moment information of each satellite.

In some possible embodiments, when the electronic device is to calculate the available storage resource of each satellite at the first moment, the electronic device may first calculate the second moment information corresponding to each satellite entering a corresponding ground station, and then judge whether the second moment corresponding to the second moment information is before or after the first moment, wherein if the second moment is before the first moment, it means that the corresponding satellite further may transmit part of information to the ground station before entering the target site, so that more available storage resources are freed up; and if the second moment is after the first moment, it means that the available storage resource of the corresponding satellite when entering the target site is less than or equal to the storage resource of the satellite remaining in the current state, therefore in this case, if the storage resource of the satellite remaining in the current state is less than a preset value, it may be determined that this satellite is unsuitable for execution of photographing the target site.

Exemplarily, the step that electronic device may determine the available storage resource of each satellite at the first moment corresponding to each satellite entering the target site, according to the second moment information and the first moment information of each satellite includes:

the electronic device calculating the available storage resource of each satellite at the current moment; and next, the electronic device comparing the second moment with the first moment, wherein if the second moment is before the first moment, the available storage resource freed up after each satellite passes the corresponding ground station is calculated, and in this way, the available storage resource of each satellite at the current moment plus the available storage resource freed up after each satellite passes the corresponding ground station is taken by the electronic device as the available storage resource of each satellite at the first moment corresponding to each satellite entering the target site; and if the second moment is after the first moment, the electronic device takes the available storage resource of each satellite at the current moment as the available storage resource of each satellite at the first moment corresponding to each satellite entering the target site.

It should be noted that when calculating the available storage resource freed up after each satellite passes a corresponding ground station, the electronic device may calculate the available storage resource freed up after each satellite passes a corresponding ground station, in combination with the signal radiation range of the ground station corresponding to each satellite, according to a path length each satellite flies within the signal radiation range of the corresponding ground station, and the speed at which each satellite downloads data to the corresponding ground station.

For example, the electronic device may divide the path length each satellite flies within the radiation range of the corresponding ground station by a flying speed of each satellite, so as to obtain the time each satellite flies within the radiation range of the corresponding ground station, then multiply the result by the speed that each satellite downloads data to the corresponding ground station, so as to obtain the available storage resource freed up after each satellite passes the corresponding ground station.

In addition, it should be noted that the above two manners of calculating the storage resource of each satellite when entering the target site not only may be implemented individually, but also may be combined with each other; for example, the electronic device may first calculate the available storage resource of each satellite in the plurality of satellites at the current moment;

then calculate the storage resource which is occupied by a to-be-executed photographing task and has been deducted from each satellite; and next, compare the second moment with the first moment, wherein if the second moment is before the first moment, the electronic device may calculate the available storage resource freed up after each satellite passes the corresponding ground station.

In this way, the electronic device may add the available storage resource freed up after each satellite passes the corresponding ground station to the available storage resource of each satellite at the current moment, and subtract the storage resource which is occupied by the to-be-executed photographing task and has been deducted from each satellite, to obtain a result which is the available storage resource of each satellite at the first moment corresponding to each satellite entering the target site.

Figure 6:
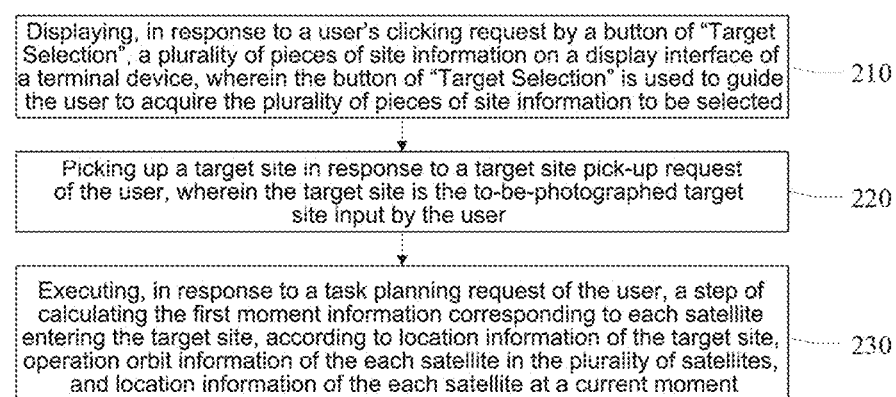
FIG. 6 shows another schematic flow block diagram of the satellite control method provided in an embodiment of the present disclosure.

Referring to FIG. 6, FIG. 6 shows another schematic flow block diagram of a satellite control method provided in an embodiment of the present disclosure, which may include the following Step 210 to step 230:

Step 210, displaying, in response to a user's operation request of a button of "Target Selection", second prompt information on a display interface of a terminal device, wherein the second prompt information is used to guide the user to input the to-be-photographed target site, and/or the second prompt information is used to guide the user to select one to-be-photographed target site from a plurality of to-be-selected sites displayed on the display interface of the terminal device.

Figures 9A, 9B:
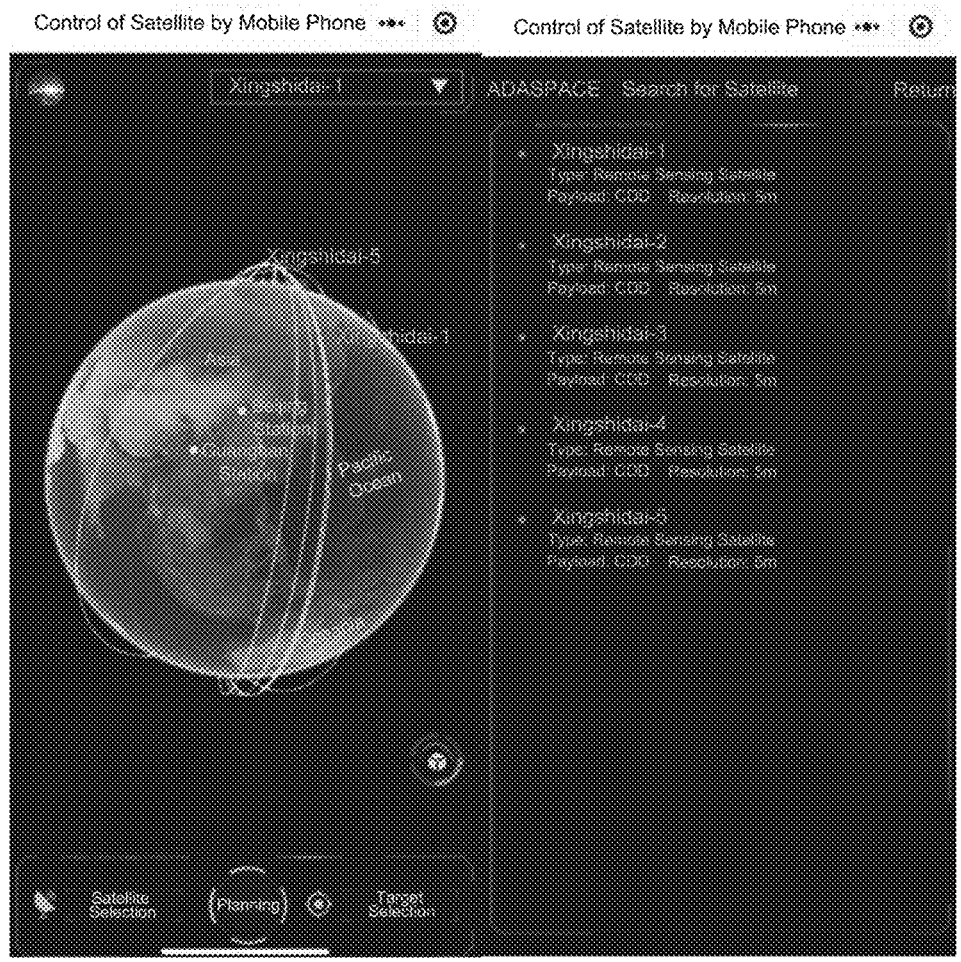
FIG. 9a is an application schematic view of the satellite control method provided in an embodiment of the present disclosure.
FIG. 9b is an application schematic view of the satellite control method provided in an embodiment of the present disclosure.
Figures 9C, 9D:
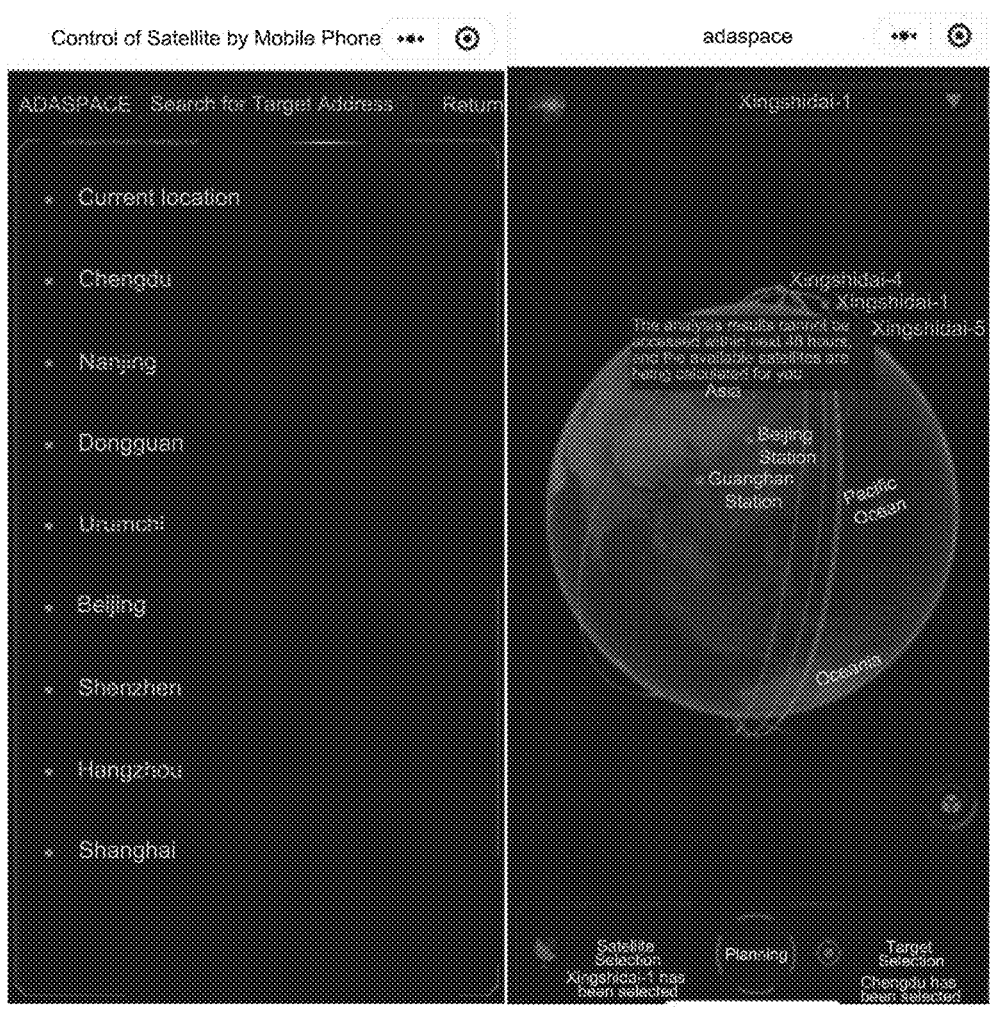
FIG. 9c is an application schematic view of the satellite control method provided in an embodiment of the present disclosure.
FIG. 9d is an application schematic view of the satellite control method provided in an embodiment of the present disclosure.

In combination with what is shown in FIG. 9a to FIG. 9f, a lower right corner of FIG. 9a may be the button of "Target Selection", and the user may send a target site operation request by clicking the button of "Target Selection", then a plurality of to-be-selected sites, for example, Chengdu, Nanjing, and Dongguan, may be displayed on the display interface of the terminal device, as shown in FIG. 9c.

In some possible embodiments, the second prompt information above may be displayed content as shown in FIG. 9c, the user may input the to-be-photographed target site in a search box at the top of the interface shown in FIG. 9c, or one target site may also be selected from a plurality of to-be-selected sites shown in FIG. 9c.

Step 220, responding to the a target site operation request of the user, wherein the target site is the to-be-photographed target site input by the user and/or the to-be-photographed target site selected from a plurality of to-be-selected sites by the user.

For the user's operation request of the target site, the user may input the to-be-photographed target site in the search box at the top of the interface shown in FIG. 9c, or may be triggered by the user clicking one target site of the plurality of to-be-selected sites shown in FIG. 9c, for example, it is assumed that Chengdu is operated by the user, then Chengdu is just the to-be-photographed target site inputted by the user.

Step 230, in response to a task planning request of the user, executing a step of calculating the first moment information corresponding to each satellite entering the target site, according to location information of the target site, operation orbit information of each satellite in the plurality of satellites, and location information of each satellite at a current moment.

In combination with what is shown in FIG. 9a, a button of "Plan" is provided right at the bottom of FIG. 9a, and the user may execute Step 120 by clicking the button of "Plan", and thus the execution is continued until it is determined whether the photographing task corresponding to the target site can be arranged to each satellite.

Figures 9E, 9F:
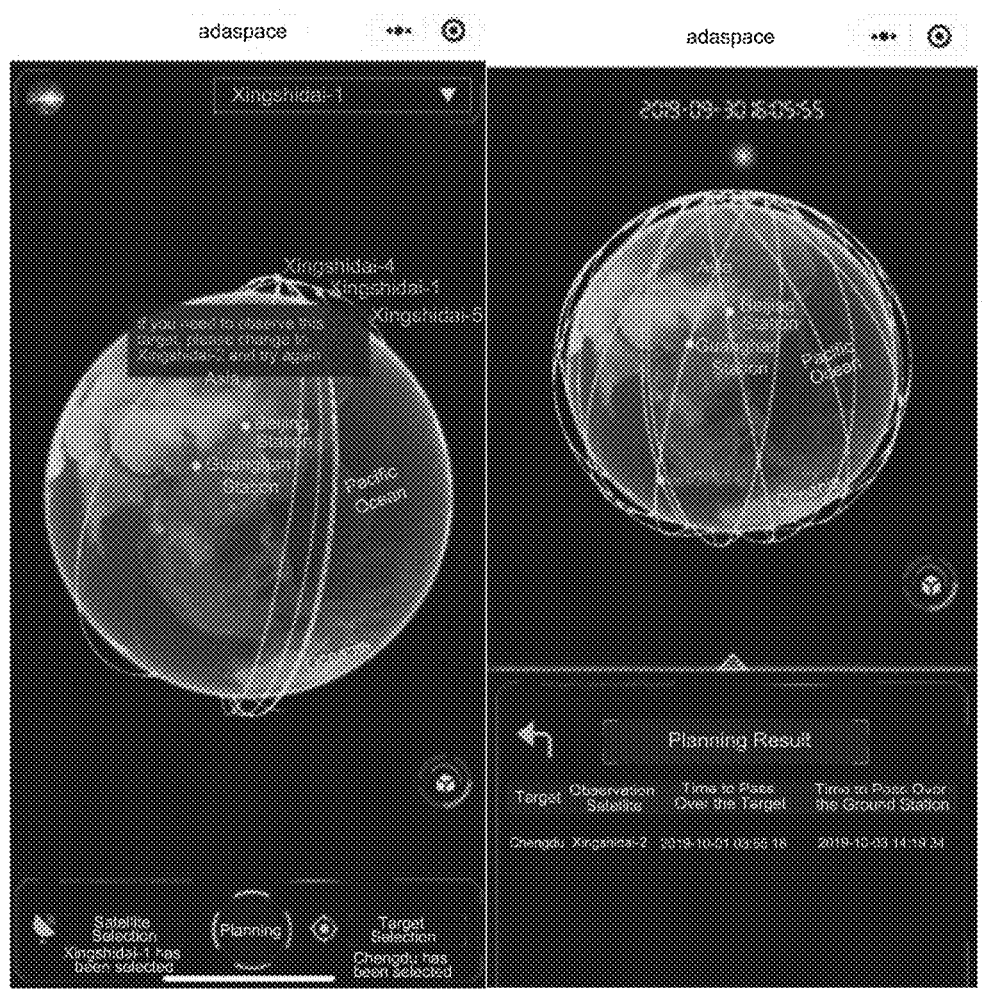
FIG. 9e is an application schematic view of the satellite control method provided in an embodiment of the present disclosure.
FIG. 9f is an application schematic view of the satellite control method provided in an embodiment of the present disclosure.

Assuming that Xingshidai-1 cannot be arranged with the photographing task corresponding to the target site, and Xingshidai-2 can be arranged with the photographing task corresponding to the target site, FIG. 9d and FIG. 9e show a prompt that Xingshidai-1 cannot be arranged with the photographing task corresponding to the target site (i.e. Chengdu); and FIG. 9f shows a prompt that Xingshidai-2 can be arranged with the photographing task corresponding to the target site (i.e. Chengdu).

In the above, in some possible embodiments, the user may select the above button in a manner of clicking a touch screen of the terminal device, or may also select the above button in a manner of voice input. The embodiment of the present disclosure does not limit the form of the user's input of information.

Optionally, before executing Step 210, the satellite control method may further include the following Step 201 to Step 202:

Step 201, displaying satellite information of a plurality of satellites on the display interface of the terminal device, in response to a satellite selection request of the user.

Referring to FIG. 9a, FIG. 9a shows a schematic view of the satellite control method on the display interface of the user's terminal device. A button of "Satellite Selection" is at a lower left corner of FIG. 9a, the user may send a satellite selection request by clicking the button of "Satellite Selection", and then satellite information of a plurality of satellites as shown in FIG. 9b may be displayed on the display interface of the terminal device, for example, Xingshidai-1, type: remote sensing satellite, payload: CCD, resolution: 5 m; Xingshidai-2, type: remote sensing satellite, payload: CCD, resolution: 5 m, etc.

Step 202, selecting a target satellite in response to a satellite pick-up request of the user, wherein the target satellite is a satellite, in the plurality of satellites, corresponding to the satellite pick-up request of the user.

The satellite pick-up request of the user may be triggered by the user clicking one piece of the satellite information of the satellite information of a plurality of satellites shown in FIG. 9b, for example, assuming that the user operates Xingshidai-1, Xingshidai-1 is just the target satellite selected by the user.

Figure 7:
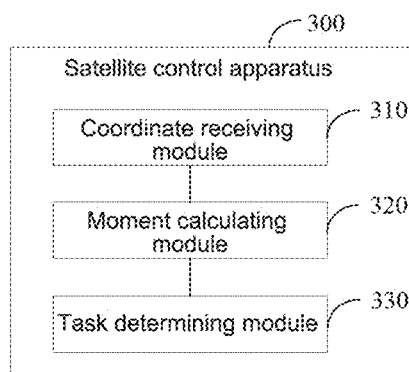
FIG. 7 is a schematic structural block diagram of a satellite control apparatus applicable to an operation control center provided in an embodiment of the present disclosure.

Referring to FIG. 7, FIG. 7 shows a schematic structural block diagram of a satellite control apparatus 300 applied to an operation control center provided in an embodiment of the present disclosure, and the satellite control apparatus 300 may include: a coordinate receiving module 310, configured to receive a to-be-photographed target site input by a user; a moment calculating module 320, configured to calculate first moment information corresponding to each satellite entering the target site, according to location information of the target site, operation orbit information of each satellite in the plurality of satellites, and location information of each satellite at a current moment; and a task determining module 330, configured to determine, from a plurality of satellites, at least one to-execute satellite to photograph the target site according to first moment information corresponding to each satellite entering the target site.

It should be noted that the function realized by the satellite control apparatus 300 shown in FIG. 7 is the same as that corresponding to the satellite control method applied to an operation control center shown in FIG. 1, and for the sake of brief description, reference is made to the above satellite control method applied to an operation control center provided in the embodiments of the present disclosure for specific functions executed by the satellite control apparatus 300, which will not be repeated herein.

Figure 8:
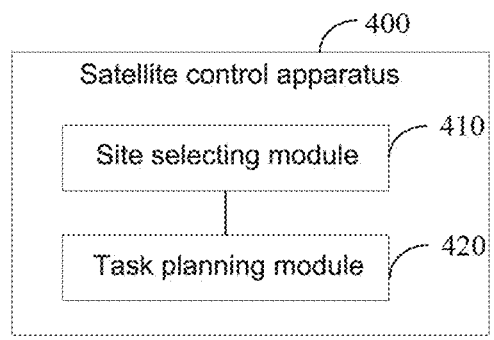
FIG. 8 is a schematic structural block diagram of a satellite control apparatus applicable to a terminal device provided in an embodiment of the present disclosure.

Referring to FIG. 8, FIG. 8 shows a schematic structural block diagram of a satellite control apparatus 400 applied to a terminal device provided in an embodiment of the present disclosure, and the satellite control apparatus 400 may include: a site operating module 410, configured to display, in response to a user's operation request of a button of "Target Selection", second prompt information on a display interface of a terminal device, wherein the second prompt information is used to guide the user to input the to-be-photographed target site, and/or the second prompt information is used to guide the user to select one to-be-photographed target site from a plurality of to-be-selected sites displayed on the display interface of the terminal device; and further configured to respond to a target site operation request of the user, wherein the target site is the to-be-photographed target site input by the user and/or the to-be-photographed target site selected from a plurality of to-be-selected sites by the user; and a task planning module 420, configured to execute, in response to a task planning request of the user, a step of calculating the first moment information corresponding to each satellite entering the target site, according to location information of the target site, operation orbit information of each satellite in the plurality of satellites, and location information of each satellite at a current moment.

It should be noted that the function realized by the satellite control apparatus 400 shown in FIG. 8 is the same as that corresponding to the satellite control method applied to a terminal device shown in FIG. 6, and for the sake of brief description, reference is made to the above satellite control method applied to a terminal device provided in the embodiments of the present disclosure for specific functions executed by the satellite control apparatus 400, which will not be repeated herein.

Figure 10:
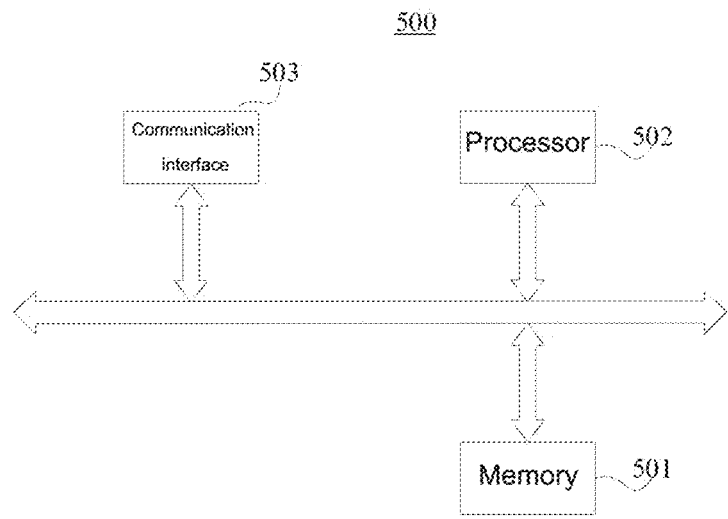
FIG. 10 is a schematic structural block diagram of an electronic device provided in an embodiment of the present disclosure.

In addition, in combination with what is shown in FIG. 10, an embodiment of the present disclosure further provides an electronic device 500, wherein the electronic device 500 may serve as the operation control center or the terminal device in the above embodiments.

In the above, as a possible implementation, the electronic device 500 may include a memory 501, a processor 502, and a communication interface 503, wherein the memory 501, the processor 502, and the communication interface 503 are electrically connected directly or indirectly to each other, so as to realize transmission or interaction of data. For example, these elements may realize electrical connection via one or more communication buses or signal lines.

The memory 501 may be configured to store software programs and modules, such as program instructions/modules corresponding to the satellite control apparatus provided in the present disclosure, and the processor 502 may execute various function applications and data processing by executing the software programs and modules stored in the memory 501, thereby executing the steps of the satellite control method provided in the present disclosure. The communication interface 503 may be configured to perform communicate of signaling or data with other node devices.

In the above, the memory 501 may be, but not limited to, Random Access Memory (RAM), Read Only Memory (ROM), Programmable Read-Only Memory (PROM), Erasable Programmable Read-Only Memory (EPROM), Electric Erasable Programmable Read-Only Memory (EEPROM) and so on.

The processor 502 may be an integrated circuit chip, with a function of processing signals. The processor 502 may be a general-purpose processor, for example, Central Processing Unit (CPU), Network Processor (NP), etc., or also may be a digital signal processor (DSP), an Application Specific Integrated Circuit (ASIC), a Field-Programmable Gate Array (FPGA) or other programmable logic devices, discrete gates, transistor logic devices, or discrete hardware components.

Based on the same inventive concept as the above method embodiment, an embodiment of the present disclosure further provides a computer readable storage medium, on which some computer programs are stored, and when these computer programs are invoked and run by the processor, the methods involved in the foregoing method embodiments and any one possible design of the method embodiments may be completed. In the embodiments of the present disclosure, the computer readable storage medium is not limited, for example, it may be RAM (random-access memory), ROM (read-only memory), and so on.

Moreover, based on the same inventive concept as the above method embodiment, the present disclosure further provides a computer program product, wherein the computer program product, when running on a computer, may complete the methods involved in the foregoing method embodiments and any one possible design of the method embodiments.

In the above, all of the electronic device, the computer storage media, and the computer program products provided in the embodiments of the present disclosure may be configured to execute the corresponding methods provided in the above embodiments, therefore, the beneficial effects that can be achieved may refer to the beneficial effects of corresponding methods provided above, which will not be repeated here.

In the embodiments provided in the present disclosure, it should be understood that the device and the method disclosed may be implemented in other manners. The device embodiment described in the above is merely exemplary, for example, the units are merely divided according to logical functions, but they may be divided in other manners in practical implementation, for example, multiple units or components may be combined or may be integrated into another system, or some features may be omitted, or not executed. In addition, mutual couplings or direct coupling or communication as shown or discussed may be indirect coupling or communication via some communication interfaces, means or units, and may be in an electrical form, a mechanical form or other forms.

Besides, the units described as separate parts may be or also may not be physically separated, the parts displayed as units may be or also may not be physical units, i.e., they may be located at one place, or also may be distributed on a plurality of network units. The objective of the solution of the present embodiment may be realized by selecting part or all of the units thereof as actually required.

Besides, the various functional modules in various embodiments of the present disclosure may be integrated together to form one independent portion, and it is also possible that the various modules exist independently, or that two or more modules are integrated to form one independent part.

In the present text, relational terms such as first and second are merely for distinguishing one entity or operation from another entity or operation, while it is not necessarily required or implied that these entities or operations have any such practical relation or order.

The above-mentioned are merely for some embodiments of the present disclosure and not used to limit the scope of protection of the present disclosure. For one skilled in the art, various modifications and changes may be made to the present disclosure. Any modifications, equivalent substitutions, improvements and so on, within the spirit and principle of the present disclosure, should be covered within the scope of protection of the present disclosure.

INDUSTRIAL APPLICABILITY

The user can acquire the remote sensing image of the target site only by inputting the to-be-photographed target site without knowing information such as the performance of all the on-orbit satellites. For example, the user can obtain, by inputting the to-be-photographed target site, at least one satellite for photographing the to-be-photographed target site, so as to select the to-execute satellite according to his own needs, can plan the photographing task for the to-execute satellite, and finally acquire the image of the target site. Through the above method, the operation difficulty of satellite control can be reduced, thereby lowering the technical threshold of the satellite control.

What is claimed is:

1. A satellite control method, applicable to an operation control center communicated to satellites, wherein the method comprises:
   receiving a to-be-photographed target site input by a user;
   calculating first moment information corresponding to each of the plurality of satellites entering the target site respectively, according to location information of the target site, operation orbit information of the each satellite, and location information of the each satellite at a current moment; and
   determining, from the plurality of satellites, at least one to-execute satellite to photograph the target site according to the first moment information corresponding to the each satellite entering the target site,
   wherein the step of calculating first moment information corresponding to each of the plurality of satellites entering the target site respectively according to location information of the target site, operation orbit information of the each satellite in the plurality of satellites, and location information of the each satellite at a current moment comprises:
   calculating angle information of the each satellite relative to the target site at the current moment according to location information of each satellite in the plurality of satellites and the location information of the target site; and
   calculating the first moment information of the each satellite entering the target site, according to the angle information of the each satellite relative to the target site at the current moment, and operation orbit information of the each satellite, and
   wherein the step of calculating angle information of the each satellite relative to the target site at the current moment according to location information of the each satellite in the plurality of satellites and the location information of the target site comprises:
   converting coordinates of the target site from a spherical coordinate system to an earth-fixed coordinate system;
   converting the coordinates of the target site from the earth-fixed coordinate system to the J2000 coordinate system;
   converting the coordinates of the target site from the J2000 coordinate system to an orbital coordinate system; and
   calculating angle information of the each satellite relative to the target site at the current moment, using the coordinates of the target site in the orbital coordinate system, and coordinates related to the location information of each of the satellites at the current moment.

2. The satellite control method according to claim 1, wherein the step of determining from the plurality of satellites at least one to-execute satellite to photograph the target site according to the first moment information corresponding to the each satellite entering the target site comprises:

calculating available storage resource of the each satellite at a first moment corresponding to the each satellite in the plurality of satellites entering the target site respectively, wherein the first moment information comprises the first moment; and determining, from the plurality of satellites, at least one to-execute satellite to photograph the target site, according to the available storage resource of the each satellite in the plurality of satellites, wherein the available storage resource of each of the to-execute satellites is capable of satisfying a storage resource requirement for photographing the target site.

3. The satellite control method according to claim 1, wherein the step of determining from the plurality of satellites at least one to-execute satellite to photograph the target site according to the first moment information corresponding to the each satellite entering the target site comprises:

determining a satellite firstly entering the target site as the to-execute satellite, according to the first moment information corresponding to the each satellite entering the target site, wherein the first moment information comprises a first moment; and arranging the to-execute satellite to photograph the target site.

4. The satellite control method according to claim 1, wherein the step of determining from the plurality of satellites at least one to-execute satellite to photograph the target site according to the first moment information corresponding to the each satellite entering the target site comprises:

calculating available storage resource of the each satellite at a first moment corresponding to the each satellite in the plurality of satellites entering the target site respectively, wherein the first moment information comprises the first moment;

selecting, from the plurality of satellites, all candidate satellites according to the available storage resource of the each satellite in the plurality of satellites, wherein each of the candidate satellites has storage resource satisfying a requirement for photographing the target site;

determining, from the selected candidate satellites, a satellite firstly entering the target site as the to-execute satellite, according to the selected candidate satellites and the first moment information corresponding to the selected candidate satellites entering the target site respectively; and arranging the to-execute satellite to photograph the target site.

5. The satellite control method according to claim 2, wherein the step of calculating available storage resource of the each satellite at a first moment corresponding to each satellite in the plurality of satellites entering the target site respectively comprises:

calculating second moment information corresponding to the each satellite in the plurality of satellites entering a corresponding ground station respectively, wherein the ground station is configured to receive information returned by a corresponding satellite, and the second moment information comprises a second moment; and determining the available storage resource of the each satellite at the first moment corresponding to the each satellite entering the target site, according to the second moment information and the first moment information of the each satellite.

6. The satellite control method according to claim 5, wherein the step of determining the available storage resource of the each satellite at the first moment corresponding to the each satellite entering the target site, according to the second moment information and the first moment information of the each satellite comprises calculating the available storage resource of the each satellite at the current moment;

comparing the second moment with the first moment, wherein if the second moment is before the first moment, the available storage resource, which is freed up after the each satellite passes the corresponding ground station, is calculated; and the available storage resource of the each satellite at the current moment plus the available storage resource freed up after the each satellite passes the corresponding ground station is taken as the available storage resource of the each satellite at the first moment corresponding to the each satellite entering the target site; and if the second moment is after the first moment, the available storage resource of the each satellite at the current moment is taken as the available storage resource of the each satellite at the first moment corresponding to the each satellite entering the target site.

7. The satellite control method according to claim 5, wherein the step of calculating second moment information corresponding to the each satellite in the plurality of satellites entering a corresponding ground station respectively comprises:

calculating angle information of the each satellite in the plurality of satellites relative to the corresponding ground station at the current moment, according to location information of the each satellite in the plurality of satellites at the current moment and location information of the ground station corresponding to each satellite in the plurality of satellites; and calculating second moment information of the each satellite in the plurality of satellites when entering the corresponding ground station according to the angle information of the each satellite in the plurality of satellites relative to the corresponding ground station at the current moment, antenna constraint condition, and operation orbit information of each satellite in the plurality of satellites.

8. The satellite control method according to claim 5, wherein the step of calculating angle information of the each satellite in the plurality of satellites relative to the corresponding ground station at the current moment according to location information of the each satellite in the plurality of satellites at the current moment and location information of the ground station corresponding to each satellite in the plurality of satellites comprises:

converting coordinates related to location information of the each satellite at the current moment from a J2000 coordinate system to an earth-fixed coordinate system;

calculating location coordinates of the each satellite in a station coordinate system according to the coordinates of the each satellite in the earth-fixed coordinate system; and calculating angle information of the each satellite relative to the ground station at the current moment, according to location coordinates of the each satellite in the station coordinate system.

9. The satellite control method according to claim 2, wherein the step of calculating available storage resource of the each satellite at a first moment corresponding to each satellite in the plurality of satellites entering the target site respectively comprises:

calculating the available storage resource of the each satellite in the plurality of satellites at the current moment;

calculating storage resource which is occupied by a to-be-executed photographing task and has been deducted from the each satellites; and calculating a difference between the available storage resource of the each satellite in the plurality of satellites at the current moment and the storage resource that has been deducted from the corresponding satellite, wherein the difference is the available storage resource of the corresponding satellite at the first moment.

10. The satellite control method according to claim 2, wherein after determining from the plurality of satellites at least one to-execute satellite to photograph the target site according to the available storage resource of the each satellite in the plurality of satellites, the method further comprises:

feeding back satellite information of at least one to-execute satellite to a user terminal, and outputting prompt information, wherein the prompt information is used to prompt the user to select one target satellite from the at least one to-execute satellite to photograph the target site; and putting the photographing task of photographing the target site into a task list of the target satellite, and deducting from the target satellite the storage resource required for photographing the target site.

11. A satellite control apparatus, applicable to an operation control center communicated to satellites, wherein the apparatus comprises:

a coordinate receiving module, configured to receive a to-be-photographed target site input by a user;

a moment calculating module, configured to calculate first moment information corresponding to each satellite entering the target site, according to location information of the target site, operation orbit information of the each satellite in the plurality of satellites, and location information of the each satellite at a current moment; and a task determining module, configured to determine, from the plurality of satellites, at least one to-execute satellite to photograph the target site, according to the first moment information corresponding to the each satellite entering the target site, wherein configuration to calculate first moment information corresponding to each of the plurality of satellites entering the target site respectively according to location information of the target site, operation orbit information of the each satellite in the plurality of satellites, and location information of the each satellite at a current moment comprises configuration to:

calculate angle information of the each satellite relative to the target site at the current moment according to location information of each satellite in the plurality of satellites and the location information of the target site; and calculate the first moment information of the each satellite entering the target site, according to the angle information of the each satellite relative to the target site at the current moment, and operation orbit information of the each satellite, wherein configuration to calculate angle information of the each satellite relative to the target site at the current moment according to location information of the each satellite in the plurality of satellites and the location information of the target site comprises configuration to:

convert coordinates of the target site from a spherical coordinate system to an earth-fixed coordinate system;

convert the coordinates of the target site from the earth-fixed coordinate system to the J2000 coordinate system;

convert the coordinates of the target site from the J2000 coordinate system to an orbital coordinate system; and calculate angle information of the each satellite relative to the target site at the current moment, using the coordinates of the target site in the orbital coordinate system, and coordinates related to the location information of each of the satellites at the current moment.

12. An electronic device, comprising: a processor, a memory, and a bus, wherein the memory is stored with machine readable instructions executable by the processor; and when the electronic device runs, the processor and the memory communicate with each other through the bus, and machine readable instructions execute, when executed by the processor, the method according to claim 1.

13. The satellite control method according to claim 4, wherein the step of calculating available storage resource of the each satellite at a first moment corresponding to each satellite in the plurality of satellites entering the target site respectively comprises:

calculating second moment information corresponding to the each satellite in the plurality of satellites entering a corresponding ground station respectively, wherein the ground station is configured to receive information returned by a corresponding satellite, and the second moment information comprises a second moment; and determining the available storage resource of the each satellite at the first moment corresponding to the each satellite entering the target site, according to the second moment information and the first moment information of the each satellite.

14. The satellite control method according to claim 13, wherein the step of determining the available storage resource of the each satellite at the first moment corresponding to the each satellite entering the target site, according to the second moment information and the first moment information of the each satellite comprises:

calculating the available storage resource of the each satellite at the current moment;

comparing the second moment with the first moment, wherein if the second moment is before the first moment, the available storage resource, which is freed up after the each satellite passes the corresponding ground station, is calculated; and the available storage resource of the each satellite at the current moment plus the available storage resource freed up after the each satellite passes the corresponding ground station is taken as the available storage resource of the each satellite at the first moment corresponding to the each satellite entering the target site; and if the second moment is after the first moment, the available storage resource of the each satellite at the current moment is taken as the available storage resource of the each satellite at the first moment corresponding to the each satellite entering the target site.

15. The satellite control method according to claim 6, wherein the step of calculating second moment information corresponding to the each satellite in the plurality of satellites entering a corresponding ground station respectively comprises:
    calculating angle information of the each satellite in the plurality of satellites relative to the corresponding ground station at the current moment, according to location information of the each satellite in the plurality of satellites at the current moment and location information of the ground station corresponding to each satellite in the plurality of satellites; and
    calculating second moment information of the each satellite in the plurality of satellites when entering the corresponding ground station according to the angle information of the each satellite in the plurality of satellites relative to the corresponding ground station at the current moment, antenna constraint condition, and operation orbit information of each satellite in the plurality of satellites.

16. The satellite control method according to claim 13, wherein the step of calculating second moment information corresponding to the each satellite in the plurality of satellites entering a corresponding ground station respectively comprises:
    calculating angle information of the each satellite in the plurality of satellites relative to the corresponding ground station at the current moment, according to location information of the each satellite in the plurality of satellites at the current moment and location information of the ground station corresponding to each satellite in the plurality of satellites; and
    calculating second moment information of the each satellite in the plurality of satellites when entering the corresponding ground station according to the angle information of the each satellite in the plurality of satellites relative to the corresponding ground station at the current moment, antenna constraint condition, and operation orbit information of each satellite in the plurality of satellites.

17. The satellite control method according to claim 6, wherein the step of calculating angle information of the each satellite in the plurality of satellites relative to the corresponding ground station at the current moment according to location information of the each satellite in the plurality of satellites at the current moment and location information of the ground station corresponding to each satellite in the plurality of satellites comprises:
    converting coordinates related to location information of the each satellite at the current moment from a J2000 coordinate system to an earth-fixed coordinate system;
    calculating location coordinates of the each satellite in a station coordinate system according to the coordinates of the each satellite in the earth-fixed coordinate system; and
    calculating angle information of the each satellite relative to the ground station at the current moment, according to location coordinates of the each satellite in the station coordinate system.

18. The satellite control method according to claim 4, wherein the step of calculating available storage resource of the each satellite at a first moment corresponding to each satellite in the plurality of satellites entering the target site respectively comprises:
    calculating the available storage resource of the each satellite in the plurality of satellites at the current moment;
    calculating storage resource which is occupied by a to-be-executed photographing task and has been deducted from the each satellites; and
    calculating a difference between the available storage resource of the each satellite in the plurality of satellites at the current moment and the storage resource that has been deducted from the corresponding satellite, wherein the difference is the available storage resource of the corresponding satellite at the first moment.

* * * * *